United States Patent
Hotta et al.

(10) Patent No.: US 12,461,517 B2
(45) Date of Patent: Nov. 4, 2025

(54) DISPLAY DEVICE, DISPLAY METHOD AND PROGRAM

(71) Applicant: MITSUBISHI HEAVY INDUSTRIES, LTD., Tokyo (JP)

(72) Inventors: Tomohiro Hotta, Tokyo (JP); Eisuke Noda, Tokyo (JP); Mizuki Kasamatsu, Tokyo (JP); Kazuya Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 407 days.

(21) Appl. No.: 18/010,009

(22) PCT Filed: Jun. 29, 2021

(86) PCT No.: PCT/JP2021/024452
§ 371 (c)(1),
(2) Date: Dec. 13, 2022

(87) PCT Pub. No.: WO2022/030143
PCT Pub. Date: Feb. 10, 2022

(65) Prior Publication Data
US 2023/0324897 A1    Oct. 12, 2023

(30) Foreign Application Priority Data
Aug. 7, 2020  (JP) .................... 2020-135159

(51) Int. Cl.
*G05B 23/02*    (2006.01)
(52) U.S. Cl.
CPC .................. *G05B 23/0272* (2013.01)

(58) Field of Classification Search
CPC .................. G05B 23/0272; Y02E 30/00
See application file for complete search history.

(56) References Cited

U.S. PATENT DOCUMENTS

| 2005/0033466 A1 | 2/2005 | Eryurek et al. |
| 2015/0269505 A1 | 9/2015 | Arita et al. |

(Continued)

FOREIGN PATENT DOCUMENTS

| CN | 105448361 A | * | 3/2016 | ............. G21C 17/06 |
| CN | 106340333 A | * | 1/2017 | |

(Continued)

OTHER PUBLICATIONS

International Search Report dated Sep. 21, 2021, issued in counterpart Application No. PCT/JP2021/024452, with English Translation. (4 pages).

(Continued)

*Primary Examiner* — Mong-Shune Chung
(74) *Attorney, Agent, or Firm* — WHDA, LLP

(57) ABSTRACT

A display device that guides monitoring items or operations required for protection of functions important for safety when an accident occurs is provided. The display device displays states of functions important for safety in a plant after accident occurrence in order of priority of the functions, and displays a value of a monitoring parameter for determining the state of the function, displays the monitoring parameter in a warning aspect when the value of the monitoring parameter deviates from a normal range, displays operations required for returning of the value of the monitoring parameter to the normal range in descending order of priority, and presents whether or not the operation can be executed.

13 Claims, 10 Drawing Sheets

(56) References Cited

U.S. PATENT DOCUMENTS

| | | | |
|---|---|---|---|
| 2015/0310945 A1* | 10/2015 | Ueda | G21C 17/00 376/245 |
| 2016/0329117 A1 | 11/2016 | Noda et al. | |
| 2017/0269580 A1* | 9/2017 | Hirahatake | G05B 23/0229 |
| 2018/0080782 A1 | 3/2018 | Noda et al. | |
| 2018/0107934 A1 | 4/2018 | Noda et al. | |
| 2018/0114176 A1 | 4/2018 | Noda et al. | |
| 2018/0120131 A1 | 5/2018 | Noda et al. | |
| 2018/0157378 A1 | 6/2018 | Noda et al. | |
| 2018/0366235 A1* | 12/2018 | Hanada | G21C 17/00 |

FOREIGN PATENT DOCUMENTS

| | | | | |
|---|---|---|---|---|
| CN | 109690641 A * | 4/2019 | | G06N 20/00 |
| DE | 60004528 T2 * | 6/2004 | | |
| EP | 0849693 A2 | 6/1998 | | |
| JP | S59-161707 A | 9/1984 | | |
| JP | H10-334078 A | 12/1998 | | |
| JP | 2015-176514 A | 10/2015 | | |
| JP | 2016-194772 A | 11/2016 | | |
| JP | 2016-194773 A | 11/2016 | | |
| JP | 2016-194774 A | 11/2016 | | |
| JP | 2016-194920 A | 11/2016 | | |
| JP | 6104685 B2 | 3/2017 | | |
| JP | 6262255 B2 | 1/2018 | | |
| JP | 6609625 B2 | 11/2019 | | |
| JP | 6639478 B2 | 2/2020 | | |
| WO | 2015/102061 A1 | 7/2015 | | |
| WO | 2016/158784 A1 | 10/2016 | | |
| WO | 2016/158800 A1 | 10/2016 | | |
| WO | 2016/158801 A1 | 10/2016 | | |
| WO | 2016/189954 A1 | 12/2016 | | |

OTHER PUBLICATIONS

Written Opinion dated Sep. 21, 2021, issued in counterpart Application No. PCT/JP2021/024452, with English Translation. (6 pages).

* cited by examiner

FIG. 5

| FUNCTION IMPORTANT FOR SAFETY | MONITORING PARAMETER | THRESHOLD VALUE (WARNING) | THRESHOLD VALUE (CAUTION) | BACKUP PARAMETER | DETAILED PARAMETER | CORRESPONDING OPERATION | CORRESPONDING SYSTEM | |
|---|---|---|---|---|---|---|---|---|
| FUNCTION 1 | PARAMETER 1 | XXX | XXX | — | | OPERATION 1 | SYSTEM 11(PRIORITY 1), SYSTEM 12(PRIORITY 2), SYSTEM 13(PRIORITY 3), SYSTEM 14(PRIORITY 4), SYSTEM 15(PRIORITY 5) | ⋮ |
| FUNCTION 1 | PARAMETER 2 | ⋮ | ⋮ | — | ⋮ | ⋮ | DITTO | ⋮ |
| FUNCTION 1 | PARAMETER 3 | ⋮ | ⋮ | — | DETAILED PARAMETER 31, DETAILED PARAMETER 32, DETAILED PARAMETER 33, DETAILED PARAMETER 34, DETAILED PARAMETER 35, DETAILED PARAMETER 36 | ⋮ | DITTO | ⋮ |
| FUNCTION 1 | PARAMETER 4 | XXX | XXX | BACKUP PARAMETER 41, BACKUP PARAMETER 42 | | OPERATION 2 | DITTO | ⋮ |
| ⋮ | ⋮ | ⋮ | ⋮ | ⋮ | ⋮ | ⋮ | ⋮ | ⋮ |
| FUNCTION 2 | ⋮ | ⋮ | ⋮ | | | ⋮ | ⋮ | ⋮ |
| ⋮ | | | | | | | | |

EXTENDED FACILITY SITUATION INPUT SCREEN (400)

Category (401):
1. CATEGORY A
2. CATEGORY B
3. CATEGORY C
4. CATEGORY D
5. CATEGORY E
...

Table (402):

| FACILITY | SITUATION | REQUIRED PREPARATION TIME | CONTINUOUS OPERATION TIME |
|---|---|---|---|
| FACILITY 1 | SUPPORT LOSS | | |
| FACILITY 2 | FAILURE | | |
| EXTENDED FACILITY 1 | IN PREPARATION | X TIME LEFT 5/1 10:00 | |
| EXTENDED FACILITY 2 | UNCONFIRMED | | |
| ... | ... | | |
| ... | ... | | |
| ... | ... | | |

(403):
- CONTINUOUS OPERATION TIME –
- USE START TIME
- PREPARATION COMPLETION TIME
- REQUIRED TIME (X HOURS)
- REQUIRED TIME (OTHERS)
- PREPARATION START TIME
- SCHEDULED PREPARATION COMPLETION TIME 5/1 10:00
- DEVICE OK
- WATER SOURCE NG
- POWER SUPPLY OK

[EDIT] (404)

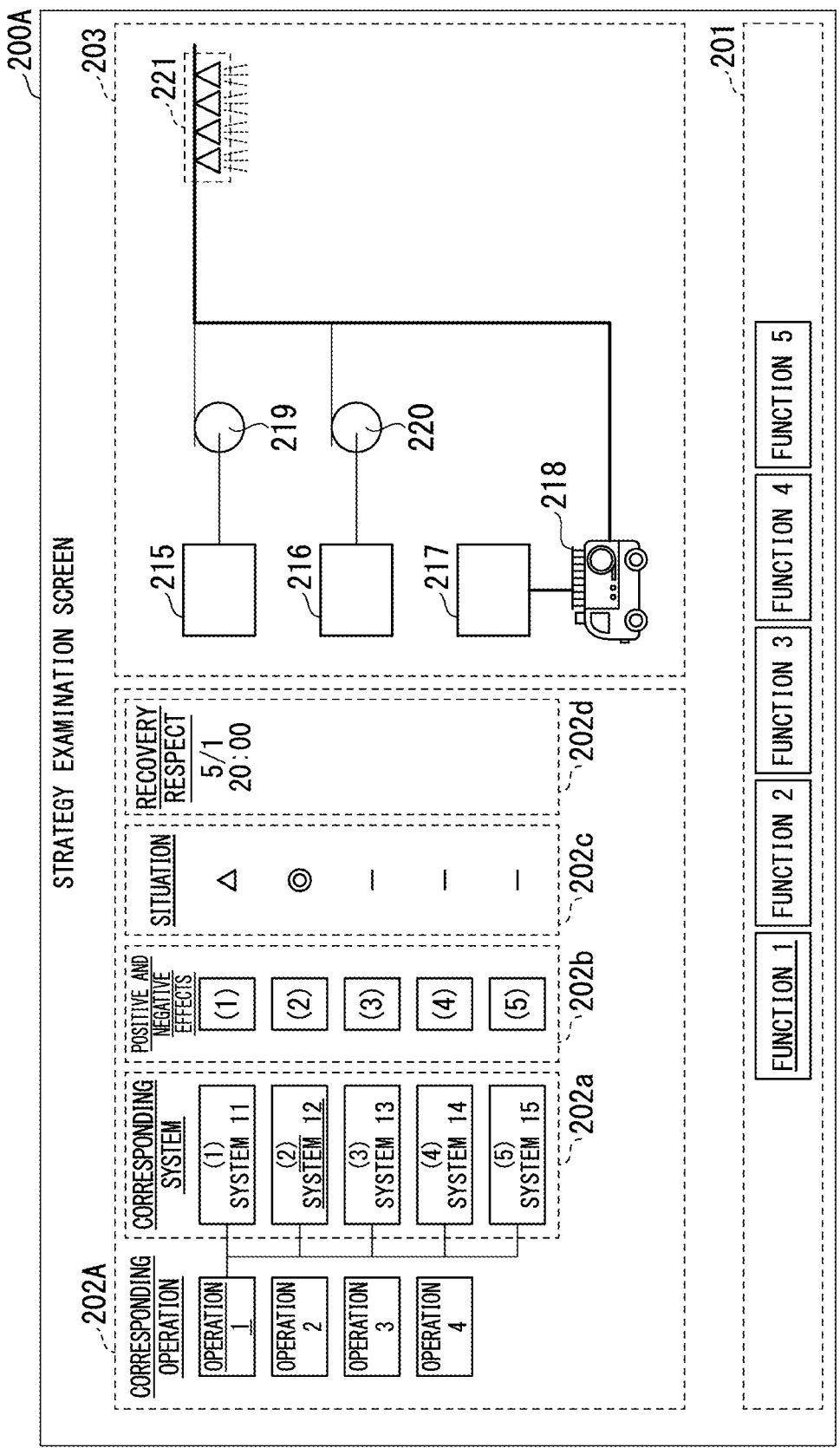

DISPLAY DEVICE, DISPLAY METHOD AND PROGRAM

TECHNICAL FIELD

The present disclosure relates to a display device, a display method, and a program.

Priority is claimed on Japanese Patent Application No. 2020-135159, filed Aug. 7, 2020, the content of which is incorporated herein by reference.

BACKGROUND ART

When an accident occurs at a nuclear power plant, there are (1) a method of specifying content of the accident and performing coping with the specified content according to a predetermined procedure, and (2) a method of performing coping so that functions important for safety are not impaired in the plant after an accident when content of the accident cannot be specified.

Patent Document 1 discloses a monitoring device for supporting multifacetedly and comprehensively determining whether or not to start a safety system and an alternative system for safe shutdown of a plant so that an operator can safely shut down the plant when a severe accident occurs.

CITATION LIST

Patent Document

[Patent Document 1] Japanese Patent No. 6104685

SUMMARY OF INVENTION

Technical Problem

When coping is performed using the method of (2), it is difficult to determine what are functions important for safety that are in an abnormal state under a plant situation or are likely to be brought into an abnormal state in the near future and whether the functions important for safety can be maintained or restored when certain coping is performed.

The present disclosure provides a display device, a display method, and a program capable of solving the above problem.

Solution to Problem

A display device of the present disclosure includes a function state display unit configured to display states of functions important for safety in a plant after accident occurrence in order of priority of the functions; and a state monitoring information display unit configured to display a value of a monitoring parameter for determining the state of the function, display the monitoring parameter in a warning aspect when the value of the monitoring parameter deviates from a normal range, and display operations required for returning of the value of the monitoring parameter to the normal range in descending order of priority.

A display method of the present disclosure includes displaying states of functions important for safety in a plant after accident occurrence in order of priority of the functions; and displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority.

A program of the present disclosure causes a computer to execute processing for: displaying states of functions important for safety in a plant after accident occurrence in order of priority of the functions; and displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority.

Advantageous Effects of Invention

According to the display device, the display method, and the program described above, it is possible to support a determination of an operator and support performing an appropriate operation after an accident occurs.

BRIEF DESCRIPTION OF DRAWINGS

FIG. 5 is a diagram illustrating an example of a setting table according to an embodiment of the present disclosure.

FIG. 6 is a diagram illustrating an example of an extended facility situation display setting screen according to an embodiment of the present disclosure.

FIG. 7 is a third diagram illustrating an example of the strategy examination screen according to the embodiment of the present disclosure.

DESCRIPTION OF EMBODIMENTS

Embodiments

Hereinafter, an operation support system of the present disclosure will be described with reference to FIGS. 1 to 9.

(Configuration)

Figure 1:
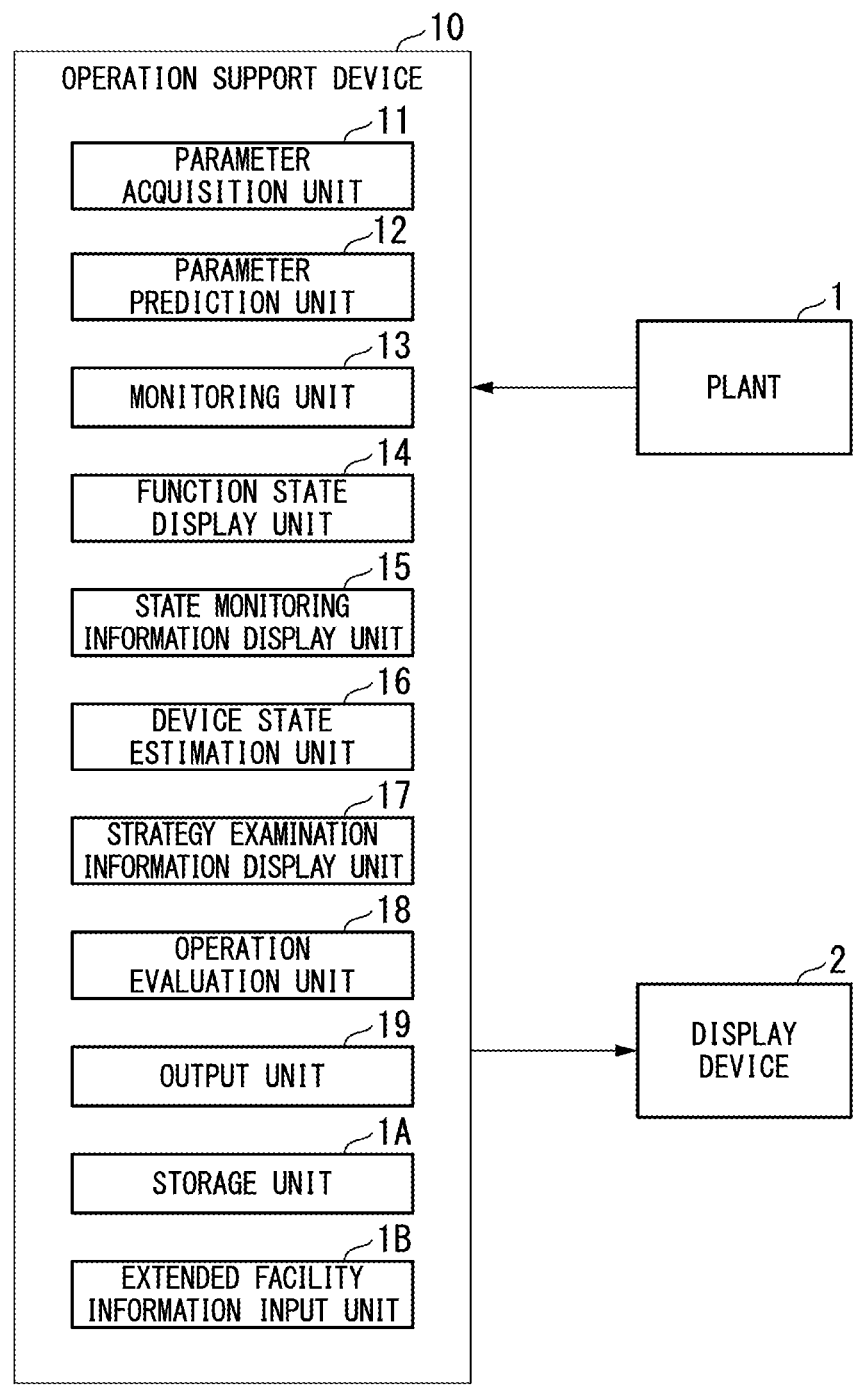
FIG. 1 is a block diagram illustrating an example of an operation support device according to an embodiment of the present disclosure.

FIG. 1 is a block diagram illustrating an example of an operation support device according to an embodiment of the present disclosure. The operation support device 10 is a device that performs support of plant monitoring and operations of an operator. When an accident occurs in a plant, the operation support device 10 supports the operator so that the operator can ascertain states of functions important for safety in the plant after an accident (sometimes simply referred to as important functions) and appropriately perform operations required to protect the functions (restore or maintain the functions).

As illustrated, the operation support device 10 includes a parameter acquisition unit 11, a parameter prediction unit 12, a monitoring unit 13, a function state display unit 14, a state monitoring information display unit 15, a device state estimation unit 16, a strategy examination information display unit 17, an operation evaluation unit 18, an output unit 19, a storage unit 1A, and an extended facility information input unit 1B.

The parameter acquisition unit 11 acquires values of parameters indicating various states of the plant 1 from the plant 1, such as physical quantities such as a predetermined temperature, pressure, flow rate, and speed, control amounts of devices such as those of valve opening, and operating states of the devices, along with information on times when the values have been detected. Examples of the parameters acquired by the parameter acquisition unit 11 include a monitoring parameter necessary for monitoring a function important for safety of the plant 1, backup parameters used as substitutes for the monitoring parameters when the monitoring parameters cannot be used, and parameters indicating operating states of a device included in a facility system of the plant 1 that is necessary for realization of functions important for safety.

The parameter prediction unit 12 calculates future predicted values of the parameters acquired by the parameter acquisition unit 11. A prediction method of the parameter prediction unit 12 may be arbitrary. For example, the parameter prediction unit 12 may predict a predicted value for a predetermined time ahead from a trend of parameters obtained at a predetermined time, may perform prediction on the basis of a predetermined prediction model, or may simulate a state of the plant 1 for a predetermined time ahead using a simulator and calculate a value of a parameter at that time. The parameter prediction unit 12 may be included in another device instead of being included in the operation support device 10, and configured so that the operation support device 10 acquires a prediction result.

The monitoring unit 13 performs monitoring of various parameters acquired by the parameter acquisition unit 11. For example, the monitoring unit 13 compares current values of the monitoring parameters and the backup parameters corresponding to important functions among the parameters acquired by the parameter acquisition unit 11 with predetermined threshold values, and determines whether or not the parameters deviate from a normal range. Similarly the monitoring unit 13 compares a future predicted value of each of the monitoring parameters and the backup parameters corresponding to the important functions predicted by the parameter prediction unit 12 with the threshold value, and determines whether or not the predicted value of each of the parameters deviate from a normal range. When the predicted value of the parameter is predicted to exceed the threshold value, the monitoring unit 13 specifies a time when the predicted value of the parameter exceeds the threshold value.

The function state display unit 14 displays states of functions important for safety. The function state display unit 14 evaluates whether the important functions are exhibited normally or have deviated from a normal state on the basis of a determination result of the monitoring unit 13, and displays a result of the evaluation in order of priority of the important functions.

Figure 2:
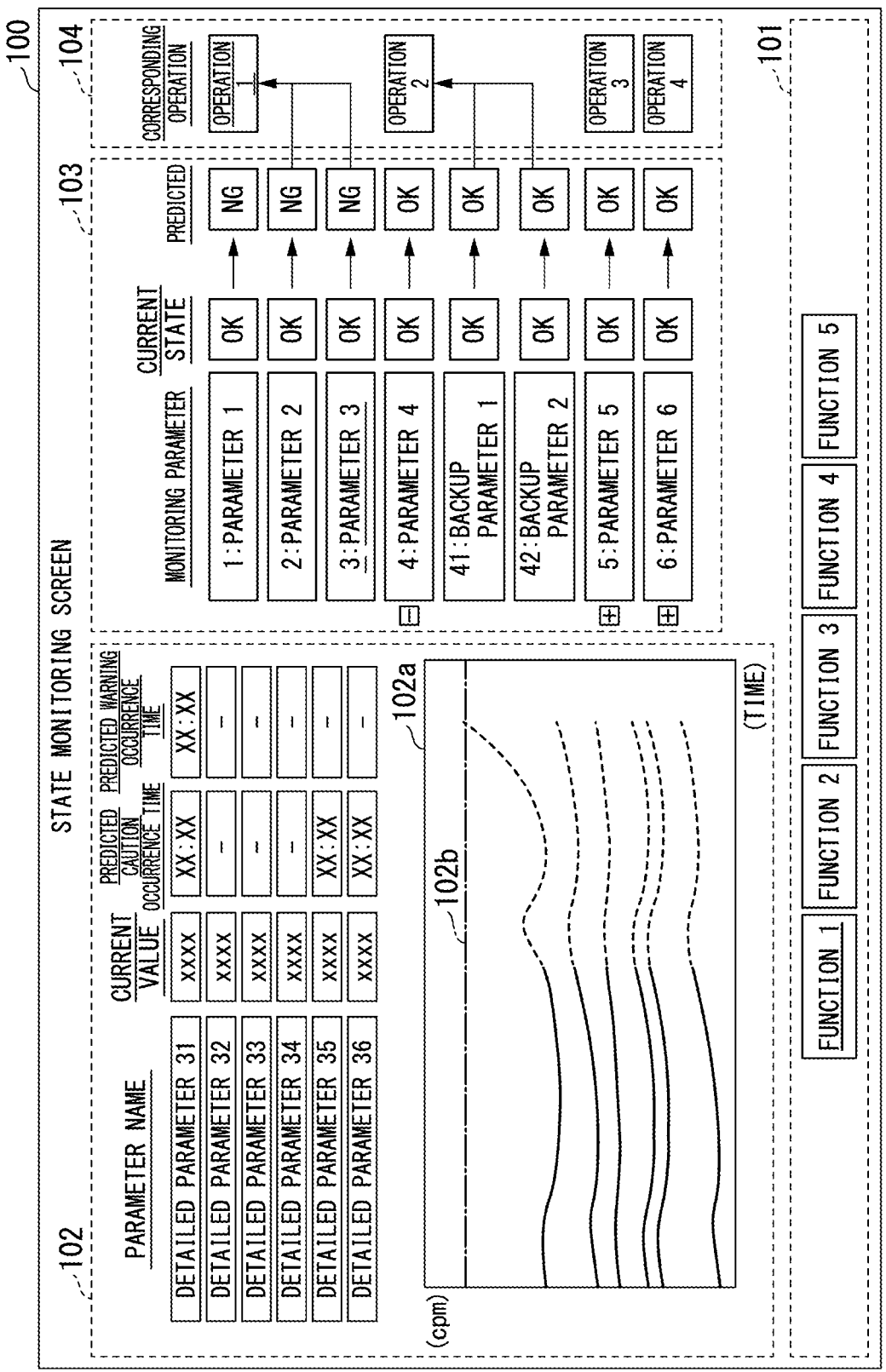
FIG. 2 is a diagram illustrating an example of a state monitoring screen according to an embodiment of the present disclosure.
Figure 3:
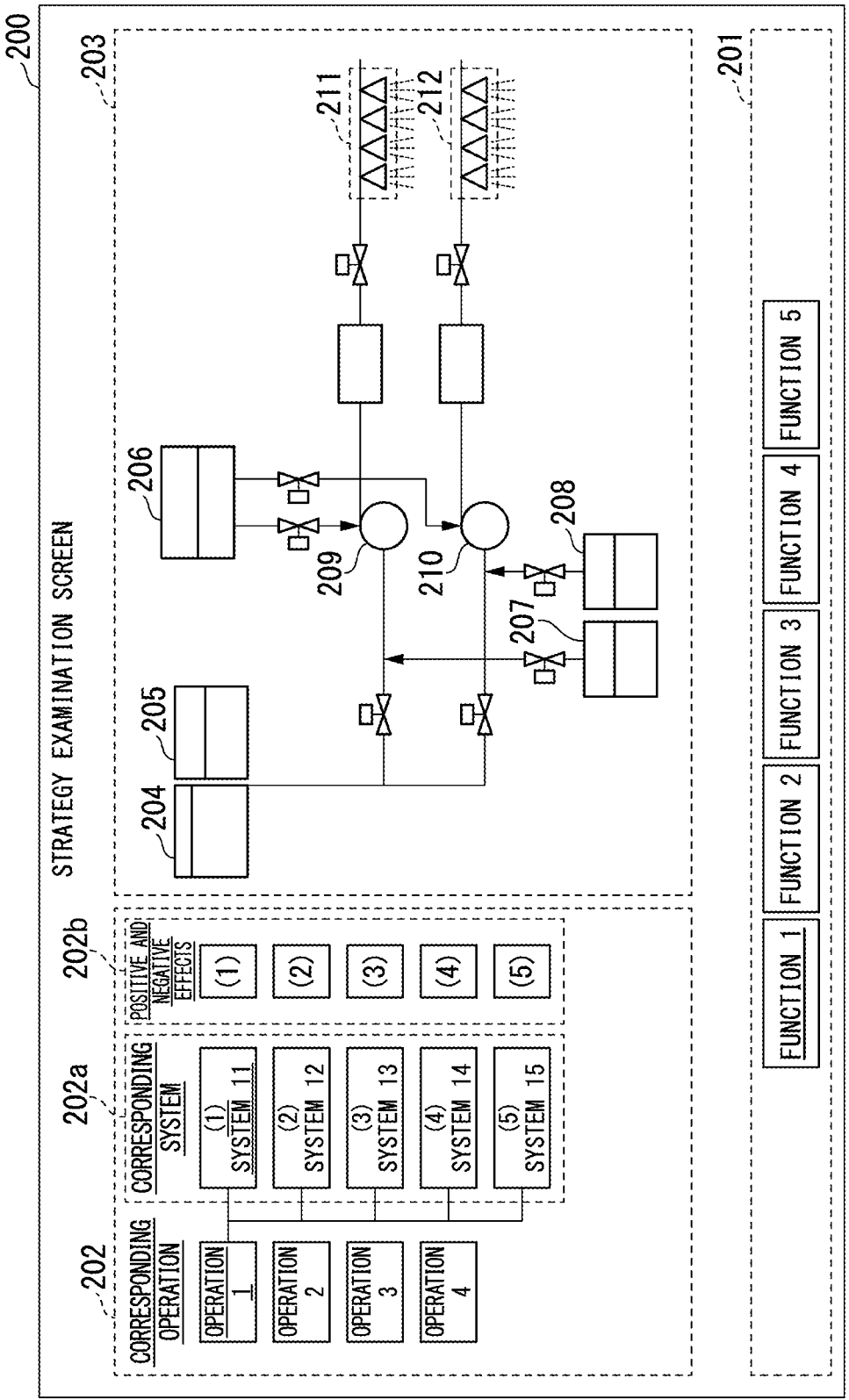
FIG. 3 is a first diagram illustrating an example of a strategy examination screen according to an embodiment of the present disclosure.
Figure 4:
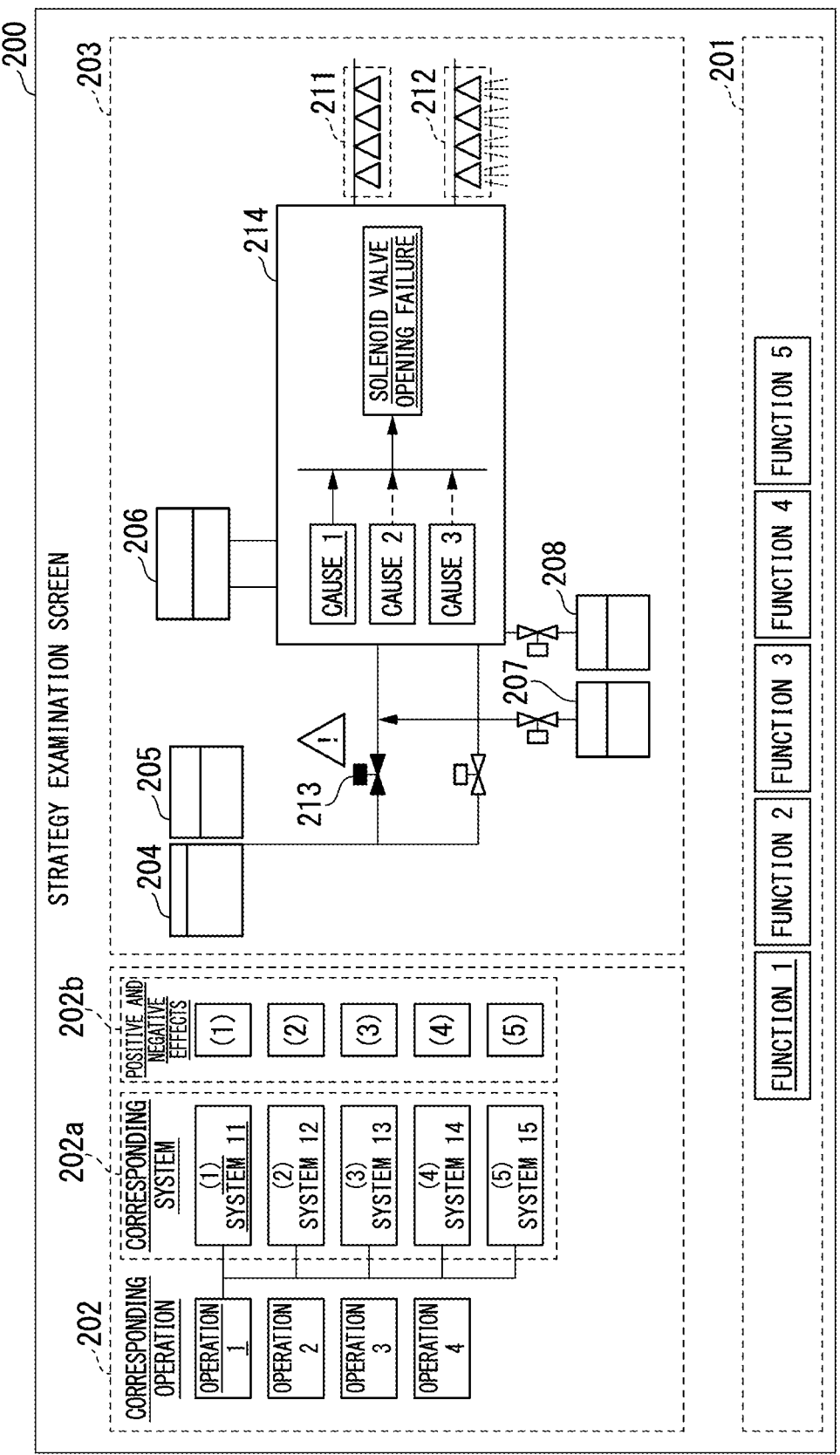
FIG. 4 is a second diagram illustrating an example of the strategy examination screen according to the embodiment of the present disclosure.

Here, reference is made to FIGS. 2 to 4. An example of the state monitoring screen 100 is illustrated in FIG. 2. The state monitoring screen 100 is a screen on which the monitoring parameters regarding states of important functions of the plant 1 are displayed. The function state display unit 14 displays the states of important functions in an area 101 of the state monitoring screen 100. Functions 1 to 5 are the important functions and are displayed in order of priority (importance). Function 1 is the most important function that should be preferentially protected. The states of the important functions are indicated by color of characters, or the like. For example, the function state display unit 14 displays a function a normal state among functions 1 to 5 in black, and functions deviating from the normal state in red. In the state monitoring screen 100 of FIG. 2, "function 1" is displayed in an aspect indicating deviation from the normal state.

Examples of a strategy examination screen 200 are illustrated in FIGS. 3 and 4. The strategy examination screen 200 is a screen in which information for examining which operation should be performed in order to return functions deviating from a normal state to the normal state is displayed. An area 201 is provided in a lower portion of the strategy examination screen 200, and the function state display unit 14 displays the states of important functions in the area 201. In the strategy examination screen 200 of FIGS. 3 and 4, "function 1" is displayed in an aspect of letters indicating that function 1 has deviated from a normal state. As will be described below, the state monitoring screen 100 illustrated in FIG. 2 and the strategy examination screen 200 can be switched and displayed. The operator can ascertain the states of the important functions irrespective of the screens displayed.

The state monitoring information display unit 15 displays details of the monitoring parameter. When a current value or predicted value of the monitoring parameter deviates from the normal range, the state monitoring information display unit 15 displays operations required for returning of the value of the monitoring parameter to the normal range in order of priority. Reference is made to FIG. 2. Function 1 to function 5 in the area 101 are configured to be selectable, and the state monitoring information display unit 15 displays details of parameters regarding the selected function (function 1) among function 1 to function 5 in areas 102 and 103 of the state monitoring screen 100. The state monitoring information display unit 15 displays a deviating state of the current value and a future value of the monitoring parameter from the threshold value in the area 103. Parameters 1 to 6 are monitoring parameters that should be monitored for a determination of a state of function 1. The state monitoring information display unit 15 performs the following display on the basis of the determination result of the monitoring unit 13. The state monitoring information display unit 15 displays "OK" in a "current state" in the area 103 when the current values of parameters 1 to 6 do not exceed the threshold values, and displays "NG" when the current values exceed the threshold values. Similarly, the state monitoring information display unit 15 displays "OK" in "Prediction" when future predicted values of parameters 1 to 6 predicted by the parameter prediction unit 12 do not exceed the threshold value and displays "NG" when the future predicted values exceed the threshold value. Parameters 1 to 6 may be one parameter or may be a generic term for a plurality of parameters. In the case of the generic term for the plurality of parameters, when a current value or predicted value of any of the parameters exceeds the threshold value, "NG" is displayed in "Current" or "Predicted". A backup parameter is present in parameters 4 to 6. The backup parameter is a parameter to be monitored instead of parameter 4, for example, when parameter 4 cannot be acquired for some reason. When the observer presses a + button on the left side of parameters 4 to 6, the state monitoring information display unit 15 displays the backup parameters and a deviating state thereof. On the other hand, when a − button is pressed, the state monitoring information display unit 15 stops displaying the backup parameters.

In the area 102, details of the monitoring parameter or the backup parameter selected in the area 103 (it is assumed that parameter 3 is selected) are displayed. The state monitoring information display unit 15 performs the following display on the basis of the parameters acquired by the parameter acquisition unit 11 or the determination result of the monitoring unit 13. The state monitoring information display unit 15 displays a current value of parameter 3 and an estimated time when a fixture predicted value of parameter 3 predicted by the parameter prediction unit 12 will exceed a threshold value in an upper end of the area 102. Detailed parameters 31 to 36 are specific parameters constituting parameter 3. When parameter 3 is pressure of a vessel, detailed parameters 31 to 36 are, for example, pressures at various positions (for example, an outlet and inlet) of the vessel. The state monitoring information display unit 15 displays a graph 102a showing transitions of past values, current values, and predicted values of detailed parameters 31 to 36 in a lower end of the area 102. A vertical axis of the graph 102a is a unit of detailed parameters 31 to 36, and a horizontal axis is time. A solid line portion of the graph of each parameter is a value of the parameter from the past to the present, and a dashed line portion is the predicted future value. In other words, a last value of the solid line portion is the current value of each parameter, and this value is displayed in the "current value" in the upper end of the area 102. In the graph 102a, for example, actual values of detailed parameters 31 to 36 30 minutes ago to the predicted values for 30 minutes in future are displayed. A threshold value 102b is displayed on the graph 102a. A prediction time at which the predicted value exceeds the threshold value 102b is displayed in the "Predicted warning occurrence time" in the upper end of the area 102. These times are times specified by the monitoring unit 13. The monitoring parameters include a parameter for which a threshold value for determining a caution target (with a lower degree of urgency or danger than a warning, but some coping is required) is set, in addition to the threshold value 102b for determining whether a warning target is set. The state monitoring information display unit 15 displays the prediction time when the predicted value exceeds the threshold value in the "Predicted warning occurrence time" in the upper end of the area 102.

In the area 104, for a monitoring parameter whose current value or predicted value exceeds the threshold value 102b, operations required to keep a value of the monitoring parameter within a normal range are displayed in order of priority. In the example of FIG. 2, operation 1, operation 2, operation 3, and operation 4 are operations required for maintenance of function 1. the operations displayed on the upper side have a higher priority, and operation 1 is an operation having the highest priority. In relation to the monitoring parameter, operation 1 becomes an operation to be performed when parameters 1 to 3 exceed a threshold value, and operations 2 to 4 are operations to be performed when parameters 4 to 6 (or corresponding backup parameters) exceed the threshold value. The state monitoring information display unit 15 displays other operations in different aspects and, for example, displays, in red, an operation ("operation 1" in the example of FIG. 2) corresponding to the monitoring parameter whose current value or predicted value exceeds a threshold value among the monitoring parameters. The state monitoring information display unit 15 may perform a display so that only "operation 1" corresponding to the monitoring parameter deviating from the normal range can be selected in the area 104 and other operations 2 to 4 cannot be selected. When "operation 1" is selected, switching from the state monitoring screen 100 to the strategy examination screen 200 is performed and a display is performed, and a means for executing "operation 1" is presented as illustrated in an area 202. When an accident of absence of procedure manual occurs, it is difficult to determine operations that should be performed in what order of priority, but the display of the area 104 allows the operator to ascertain an operation that should be performed with the highest priority.

Here, reference is made to FIG. 5. A setting table 300 illustrated in FIG. 5 is stored in the storage unit 1A. Functions important for safety, monitoring parameters, a threshold value (warning), a threshold value (caution), backup parameters, detailed parameters, corresponding operations, corresponding systems, and the like are registered in the setting table 300 in association with each other. The functions important for safety are the functions displayed in the area 101, the monitoring parameters are the monitoring parameters displayed in the area 103, the threshold values (warning) are the threshold value 102b, the threshold values (caution) are threshold values that are used to determine a caution target, the backup parameters are the backup parameters displayed in the area 103, the detailed parameter is the detailed parameter displayed in the upper end of the area 102, the corresponding operations are the operations displayed in the area 104, and the corresponding systems are facilities or systems on which an operation is performed (described below). The state monitoring information display unit 15 creates the state monitoring screen 100 illustrated in FIG. 2 according to the information registered in the setting table 300.

The device state estimation unit 16 estimates states of devices included in the plant 1 on the basis of the values of the parameter acquired by the parameter acquisition unit 11. For example, when a pump fails and the pump issues a failure signal, the failure of the pump can be recognized on the basis of the failure signal. On the other hand, in the case of a device whose operating state cannot be directly acquired, the parameter acquisition unit 11 acquires a value measured by a sensor provided around the device, and the device state estimation unit 16 estimates the operating state of the device on the basis of the acquired sensor value. For example, when three sensors are provided near device 1, a rule for determining the operating state of device 1 on the basis of values measured by the three sensors is registered in the storage unit 1A in advance. The device state estimation unit 16 estimates the operating state (operating and shut down) of device 1 on the basis of this rule and the measured values of the three sensors.

The strategy examination information display unit 17 creates the strategy examination screen 200 and displays whether or not an operation can be executed, a configuration of a facility or system that is an operation target, an operating state of the system, an influence of the operation, and the like. Reference is made to FIG. 3. The strategy examination screen 200 illustrated in FIG. 3 is displayed when "operation 1" is selected in the area 104 in FIG. 2. In the area 202 of the strategy examination screen 200, candidates for a system that is a target on which operation 1 is performed are displayed in order of priority. Operation 1 is a coping method for normalizing monitoring parameters 1 to 3 of function 1, but operation 1 can be performed in various ways. For example, operation 1 may be performed using system 11, or operation 1 may be performed using any of systems 12 to 15. However, a priority of performing operation 1 with respect to each system is determined in advance (a "corresponding system" field of the setting table 300 in FIG. 5), and the strategy examination information display unit 17 arranges and displays systems 11 to 15 in the area 202*a* in order from the top according to a priority thereof. This indicates that system 11 has the highest priority and system 15 has the lowest priority. A positive effect and a negative effect of operation 1 performed by operating systems 11 to 15 are registered in the storage unit 1A. For example, a system diagram of system 11 is displayed in the area 203 of FIG. 3. System 11 is a system for operating pumps 209 to 210 and spraying water, chemicals, or the like stored in tanks 204 to 208 from sprays 211 to 212 to cool a target facility. For example, for system 11, information such as "reduction of temperature and pressure of the target facility" as a positive effect and "submersion of a sensor provided in the target facility" as a negative effect is registered in the storage unit 1A. When "(1)" in the area 202*b* corresponding to system 11 is selected, the strategy examination information display unit 17 displays the positive and negative effects registered for the system 11 in a pop-up manner.

In the area 203, a system diagram of the system 11 selected in the area 201*a* is displayed. In the storage unit 1A, a system diagram, and information on devices such as a tank, a pump, and a valve included in the system are registered for each of systems 11 to 15 displayed in the area 201*a*. When the system 11 is selected, the strategy examination information display unit 17 reads the system diagram of system 11 and displays the system diagram in the area 203. In this case, the strategy examination information display unit 17 displays, in the system diagram, that the device is not usable when there is an unusable device on the basis of the parameter indicating the operating state of the device acquired by the parameter acquisition unit 11 or the operating state of the device estimated by the device state estimation unit 16. FIG. 4 illustrates a display example when a valve 213 is in an unusable state. In the example of FIG. 4, the strategy examination information display unit 17 displays the valve 213 in a color different from others, and displays a mark near the valve 213 to draw attention. In the storage unit 1A, causes of the unusableness of the valve 213 (for example, failure of the valve or loss of power supply) is registered, and the strategy examination information display unit 17 specifies the cause of the unusableness on the basis of the parameter acquired for the valve 213 by the parameter acquisition unit 11, and displays detailed reasons for the unusableness of the valve 213 in a logic tree shown in a window 214. For example, when the operator selects the valve 213, the strategy examination information display unit 17 may display the window 214. In the example of FIG. 4, cause 1 is specified as the reason for the unusableness of the valve 213. The strategy examination information display unit 17 does not display a state of spraying of the spray 211 that cannot spray the water due to the unusableness of the valve 213, but displays a state of spraying of the spray 212. This makes it possible for the operator to easily ascertain the operating state of system 11. For example, the operator can view the system diagram in the area 203 in FIG. 4 and ascertain that even when operation 1 is performed using system 11, system 11 cannot exhibit its original ability. The operator considers restoring the valve 213 to a usable state by referring to cause 1 shown in the window 214 or perform operation 1 using system 12 with the next highest priority. The operator can specifically examine how the operation presented in the area 104 of the state monitoring screen 100 is to be performed, by referring to the strategy examination screen 200.

As will be described below with reference to FIG. 7, the strategy examination information display unit can display an operation situation of facility whose parameters are not acquired by the parameter acquisition unit 11 on the strategy examination screen 200.

The state monitoring screen 100 and the strategy examination screen 200 can be switched and displayed. When an operation is selected on the state monitoring screen 100, the strategy examination screen 200 is displayed, and when the strategy examination screen 200 is closed by a predetermined operation, the state monitoring screen 100 is displayed.

The operation evaluation unit 18 evaluates, for each system, a result when an operation is performed using each system. For example, in the case of operation 1 illustrated in FIG. 3, the operation evaluation unit 18 evaluates, for each system, (1) a behavior of the monitoring parameter and (2) an influence of a negative effect when operation 1 is performed using each of systems 11 to 15. The operation evaluation unit 18 has a function of simulating a state of the plant 1, and calculates change in parameters 1 to 3 (FIG. 2) when operation 1 (cooling) is performed using system 11. The operation evaluation unit 18 evaluates that performing operation 1 through system 11 is effective when parameters 1 to 3 transition within the normal range defiled by the threshold value even in the future unlike the predicted value illustrated in FIG. 2, and evaluates that performing operation 1 is not effective when parameters 1 to 3 deviate from the normal range as predicted. The operation evaluation unit 18 calculates the influence of the negative effect when operation 1 (cooling) is performed using system 11. For example, when the negative effect is submersion of sensors, the operation evaluation unit 18 calculates change in water level around the target facility for each time in a case in which water is sprayed by the sprays 211 and 212. For example, the operation evaluation unit 18 evaluates that performing operation 1 through system 11 is effective when the important sensor is not submerged after operation 1 is performed, and evaluates that performing operation 1 through system 11 is not effective when the important sensor is submerged and measurement cannot be made by the sensor. The operation evaluation unit 18 performs the same calculation on the other systems 12 to 15, and evaluates the operation through each system from the two aspects including (1) a deviating state of the monitoring parameter and (2) an influence of a negative effect. The strategy examination information display unit 17 may display, in a pop-up manner, evaluation results of (1) and (2) for each system in the operation evaluation unit 18.

In the case of an example illustrated in FIG. 4 (water can only be sprayed from one system due to a failure of the valve 213), for example, the operation evaluation unit 18 simulates an operation of spraying water only from the spray 212 until the valve 213 becomes usable, and spraying water using the sprays 211 to 212 after the valve 213 becomes usable, and performs calculation and evaluation of (1) a deviating state of the monitoring parameters and (2) an influence of a negative effect when such an operation is performed. It is assumed that a time until valve 213 becomes usable is determined in advance. This makes it possible for the operator to ascertain an effect when operation 1 is performed using each of systems 11 to 15. For example, when the evaluation in the operation evaluation unit 18 is higher when operation 1 is performed using system 12 with a lower priority due to a failure of the device in system 11, the operator may examine performing operation 1 using system 12.

The extended facility information input unit 1B receives an input of operating states or information related to the operating states of the extended facility whose parameters are not acquired by the parameter acquisition unit 11 online because the extended facility is not normally connected to the plant 1, or a device or facility whose parameter cannot be acquired through the parameter acquisition unit 11 in some circumstances. The extended facility is, for example, a permanent or portable device or facility that is positioned as a facility for coping with a serious accident or the like or a diversity extended facility. The extended facility is a facility that is not normally installed in the plant 1 or is not used even when the facility is installed, and is, so to speak, a facility that is added to an appropriate system of the plant 1 and used later. Examples of the extended facility may include a fire truck. The fire truck is used as, for example, an alternative means in a situation in which water cannot be supplied due to a failure of a system that supplies water from a tank. The extended facility information input unit 1B creates and displays an extended facility situation input screen 400. The extended facility information input unit 1B performs a display of an operating state of the extended facility, information on a recovery prospect or preparation situation when the extended facility is in an inoperable state, or the like (which are collectively referred to as an operation situation), and reception of an input. FIG. 6 illustrates an example of the extended facility situation input screen 400. In an area 401 of the extended facility situation input screen 400, a list of categories in which facilities and extended facilities included in the plant 1 are classified from a function aspect is displayed. In an area 402, a list of general facilities and extended facilities classified into certain categories, and the operation situation of each facility are displayed. The general facility indicates facility whose parameters can be acquired by the parameter acquisition unit 11. For example, when the operator selects category A in the area. 401, a list of facilities classified into category A is displayed in the area 402. Facilities 1 and 2 in FIG. 6 are general facilities, and extended facilities 1 and 2 are extended facilities. Information on the general facility and the extended facility classified into respective categories is registered in the storage unit 1A in advance. A situation of facility 1 is "Support loss", which indicates that a power supply or fuel required for an operation of facility 1 have been lost. A situation of facility 2 is "failure", indicating that facility 2 is in a failed state. A situation of each facility and a cause thereof are displayed in a situation column of the area 402. In the example of FIG. 6, both facilities 1 and 2 are in a non-operable state, and for example, extended facilities are used to cope with such a situation. In the example of FIG. 6, extended facility 1 is in preparation and needs X hours before extended facility 1 can be operated. The extended facility 2 is in an unconfirmed state. In an area 403, detailed information on a situation of a certain facility is displayed. For example, when the operator selects extended facility 1 in the area 402, detailed information on extended facility 1 is displayed in the area 403. In a leftmost column of the area 403, information such as "Continuous operation time", "Use start time", and "Preparation completion time" of the selected facility is displayed. When extended facility 1 is a fire truck, for example, a period of time in which the operation is possible with one refueling is displayed in "Continuous operation time", and respective actual values are displayed in "Use start time" and "Preparation completion time". In a center column, a time assumed in advance ("X hours") until operation becomes possible is displayed in "Required time", additional required time, for example, when an unexpected event occurs during actual preparation is displayed in "Required time (others)", an actual value is displayed in "Preparation start time", and a prospect time when an extended facility 1 becomes usable, such as preparation completion time or a recovery respect tune, is displayed in "Scheduled preparation completion time" is. A state of a function of extended facility 1 is displayed in "Device", "Water source", and "Power supply" in a rightmost column. For example, in the case of a fire truck, when there is no problem with a mounted device such as a pump, "OK" is displayed for "Device", when there is no water source, "NG" is displayed for a water source, and when there is no problem with a power supply, fuel, or the like, "OK" is displayed for the power supply. In this example, a preparation time "X hours" is, for example, a time required to secure the water source. Each piece of information displayed in the area 403 can be registered from an input screen (not illustrated) created and displayed by the extended facility information input unit 1B when an edit button 404 is pressed. In this input screen, for example, an input column is provided for each item displayed in the area 403, and the operator can manually input the information. For items such as the "continuous operation time" whose standard value is known in advance, an initial value may be automatically displayed. When the operator registers necessary information on the input screen (not illustrated), the input screen is hidden and the information in the area 403 is updated. When the information in the area 403 is updated, the updated information is reflected in the item (for example, "required preparation time") displayed in the area 402. For example, when NG is input to a device, "Failure" is displayed in the situation column of the corresponding facility in the area 402, and when NG is input to the power supply, "Support loss" is displayed in the situation column of the corresponding facility in the area 402. Information displayed on the extended facility situation input screen 400 is input through the input screen (except for an item name or a facility name).

Thus, it is possible to collectively manage information on an operation situation of extended facilities whose parameters have not been automatically acquired by inputting latest site information on each facility by using the extended facility situation input screen 400. Information on the situation of the facility input from the extended facility situation input screen 400 may be input not only for the extended facility but also for a general facility whose parameters can be automatically acquired. On the other hand, information on an operation situation of the extended facility can be acquired, for example, through the parameter acquisition unit 11, not through the extended facility situation input screen 400 by communicatively connecting the extended facility to the operation support device 10 when the extended facility is used. Information input on the extended facility situation input screen 400 is recorded in the storage unit 1A.

Next, how information input through the extended facility situation input screen 400 is reflected in the strategy examination screen 200 will be described using FIG. 7. FIG. 7 illustrates an example in which the operating state of the extended facility is displayed on the strategy examination screen 200A. Areas 202c and 202d are added the area 202a of the strategy examination screen 200A, as compared to the screen illustrated in FIG. 3. A situation of each system is displayed in the area 202c, and the recovery prospect of each system is displayed in the area 202d. One system (for example, system 12) in the area 202a is associated with one or more facilities in the extended facility situation input screen 400. The strategy examination information display unit 17 displays the situation of each system in the area 202c on the basis of the information on the operation situation input to the extended facility situation input screen 400. For example, the strategy examination information display unit 17 displays a double circle when the situation of the system indicates in operation, a circle when the situation of the system indicates useable, a triangle when the situation of the system indicates in preparation, a cross when an abnormality occurs, and a bar when the situation of the system indicates unconfirmed. The strategy examination information display unit 17 displays the recovery prospect for each system in the area 202d on the basis of the information (for example, the scheduled preparation completion time) regarding the recovery prospect input to the extended facility situation input screen 400. When the operation situation of the extended facility is input on the extended facility situation input screen 400, the strategy examination information display unit 17 displays a system diagram in which the extended facility is added to the area 203. For example, when a determination is made that the pumps 219 and 220 fail on the basis of the parameters acquired by the parameter acquisition unit 11, the water stored in the tanks 215 and 216 cannot be sprayed from a spray 221. In such a situation, it is assumed that a fire truck 218 (an extended facility) is used to supply water from a water source 217 (an extended facility) to the spray 221. The operator inputs through the extended facility situation input screen 400 that the extended facility (the water source 217 and the fire truck 218) is operated. Then, the strategy examination information display unit 17 determines, for example, that these extended facilities are in an operating state on the basis of a use start time of the water source 217 and the fire trick 218 recorded in the storage unit 1A, adds the extended facilities to the system diagram, and displays the system diagram. The strategy examination information display unit 17, for example, displays a system that supplies water from the water source 217 to the spray 221 via the fire truck 218 with a thick line or a color different from others, to display that the system using the extended facility is in operation. This allows the operator to ascertain that the extended facility is being used. Thus, it is possible to perform examination of the operation, including the extended facility, by inputting an operation situation of an extended facility that is not normally connected to the operation support device 10, reflecting the operating state and performing a displaying on the strategy examination screen 200A. Design information such as a position of a certain system diagram at which the extended facility is added is registered in the storage unit 1A in advance, and the strategy examination information display unit 17 displays the area 203 on the basis of this design information. The strategy examination information display unit 17 can display the situation (the area 202c) and the recovery prospect (the area 202d) on the basis of an estimation result of the device state estimation unit 16 or the operation situation input to the general facility through the extended facility situation input screen 400 even when the operation situation of the extended facility is not input for a target system or when the extended facility is not present in the target system.

The output unit 19 outputs the state monitoring screen 100 created by the state monitoring information display unit 15 or the strategy examination screen 200 created by the strategy examination information display unit 17 to the display device 2.

The storage unit 1A stores the parameters acquired by the parameter acquisition unit 11, the setting table 300 illustrated in FIG. 5, positive and negative effects of each system, the priority of an important function, the priority of the system on which an operation is to be performed, and the like.

(Operation)

Figure 8:
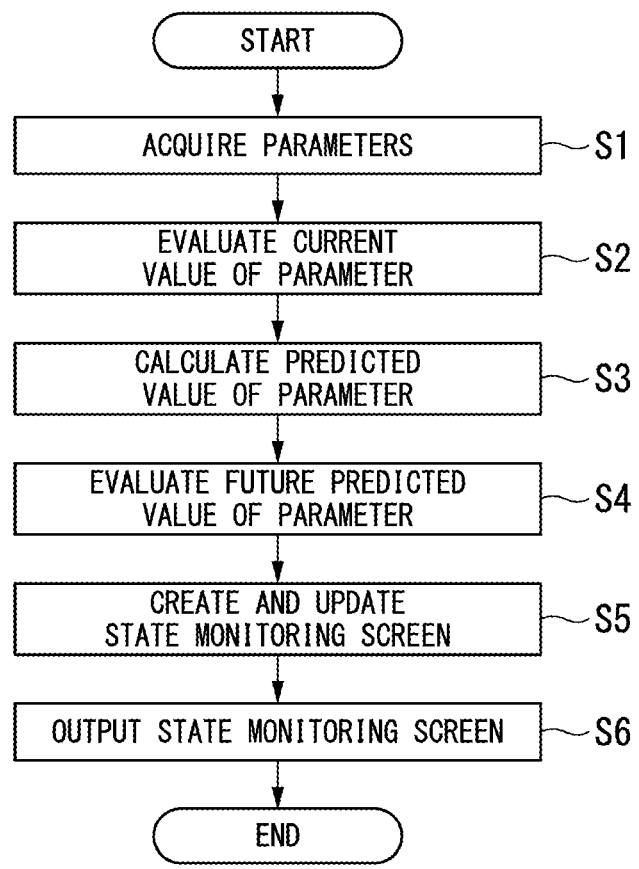
FIG. 8 is a flowchart illustrating an example of display processing of the state monitoring screen according to the embodiment of the present disclosure.

FIG. 8 is a flowchart illustrating an example of display processing of a state monitoring screen according to an embodiment of the present disclosure. The operation support device 10 executes the following processing at a predetermined cycle during a display of the state monitoring screen 100.

First, the parameter acquisition unit 11 acquires various parameters from the plant 1 (step S1). The parameter acquisition unit 11 outputs a monitoring parameter and a backup parameter among the acquired parameters to the parameter prediction unit 12, the monitoring unit 13, and the state monitoring information display unit 15. The parameter acquisition unit 11 outputs parameters regarding the operating state of the device among the acquired parameters to the device state estimation unit 16, and outputs the parameter indicating the operating state of the device to the strategy examination information display unit 17.

Next, the monitoring unit 13 compares the current value of each of the monitoring parameter and the backup parameter with a threshold value (for example, a threshold value 102b) to evaluate the current value of the parameter (step S2). The monitoring unit 13 evaluates the monitoring parameter to be normal when the monitoring parameter is within a range of the threshold value, and evaluates the monitoring parameter to be in a deviating state when the monitoring parameter exceeds the threshold value. The monitoring unit 13 outputs a result of the evaluation to the function state display unit 14 and the state monitoring information display unit 15.

Next, the parameter prediction unit 12 predicts the predicted value of the parameter (step S3). For example, the parameter prediction unit 12 predicts a transition of the monitoring parameter and the backup parameter until a predetermined time ahead. The parameter prediction unit 12 outputs a result of the prediction to the monitoring unit 13 and the state monitoring information display unit 15.

Next, the monitoring unit 13 compares the predicted values of the monitoring parameter and the backup parameter with the threshold values to evaluate the predicted values of the parameters (step S4). When any of the predicted values until a predetermined time ahead predicted by the parameter prediction unit 12 exceeds the threshold value, the monitoring unit 13 evaluates that the monitoring parameter deviates from the normal range until the predetermined time ahead, and otherwise evaluates that the monitoring parameter transitions within a value of the normal range. The monitoring unit 13 outputs a result of the evaluation to the function state display unit 14 and the state monitoring information display unit 15.

Next, the state monitoring information display unit 15 creates and updates the state monitoring screen 100 (step S5). For example, when no important function is selected in the area 101, the state monitoring information display unit 15 reads the monitoring parameter, the backup parameter, the detailed parameter, and the corresponding operation corresponding to function 1 on the basis of the setting in the setting table 300 for function 1 that is the important function having the highest priority, and displays these in the areas 102 to 104. The state monitoring information display unit 15 displays the current state and the predicted value in the area 103, such as the current value and the predicted warning occurrence time in the upper end of the area 102 on the basis of the evaluation result of the monitoring unit 13. The state monitoring information display unit 15 displays the graph 102a in the lower end of the area 102 on the basis of a prediction result of the parameter prediction unit 12 and past actual values of the parameters accumulated in the storage unit 1A. When the important function is selected in the area 101, the state monitoring information display unit 15 performs the same processing on the selected function. The function state display unit 14 determines whether or not function 1 is normal until a predetermined time ahead on the basis of the evaluation of the current value and predicted value of the monitoring parameter regarding function 1 by the monitoring unit 13, and displays a result of the determination in the area 101 of the state monitoring screen 100. The function state display unit 14 performs the same processing for the functions 2 to 5. Next, the output unit 19 outputs the updated state monitoring screen 100 to the display device 2 (step S6).

In the flowchart of FIG. 8, an order of step S2, step S3 and step S4 is for convenience, and step S2, step S3 and step S4 may be executed in parallel.

Figure 9:
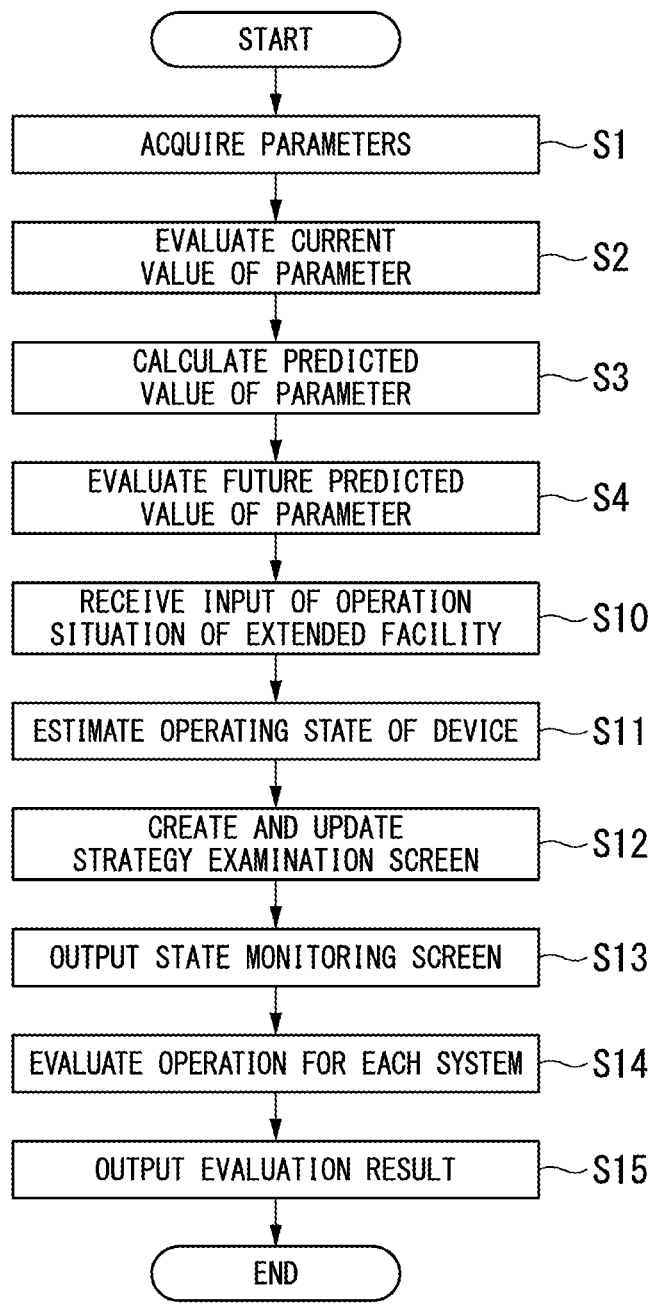
FIG. 9 is a flowchart illustrating an example of display processing and evaluation processing of the strategy examination screen according to the embodiment of the present disclosure.

FIG. 9 is a flowchart illustrating an example of display processing and evaluation processing of the strategy examination screen according to an embodiment of the present disclosure. The operation support device 10 executes the following processes at a predetermined cycle during the display of the strategy examination screen 200.

Processing of steps S1 to S4 is the same as those described using FIG. 6. The parameter acquisition unit 11 acquires various parameters from the plant 1 (step S1). The monitoring unit 13 evaluates the current value of the parameter (step S2). The parameter prediction unit 12 calculates the predicted value of the parameter, and the monitoring unit 13 evaluates the future predicted value of the parameter (step S4). The function state display unit 14 performs a display of the area 201 of the strategy examination screen 200 on the basis of a result of the evaluation of the monitoring unit 13.

Next, the extended facility information input unit 1B displays the extended facility situation input screen 400 on the basis of an operation of the operator. The extended facility information input unit 1B receives an input of information on the operation situation of the extended facility, or the like, and records the input information in the storage unit 1A (step S10). An order of processing of steps S1 to S10 is for convenience, and the processing of step S10 is executed in parallel with steps S1 to S4 or next step S11.

Next, the device state estimation unit 16 performs estimation of the operating state on the device of which the parameter indicating the operating state cannot be acquired among devices included in the system corresponding to the operation selected in the area 104 of the state monitoring screen 100 (a corresponding system of the setting table 300) (step S11). The device state estimation unit 16 outputs an estimation result (for example, operation and shutdown) for the operating state to the strategy examination information display unit 17. Processing of step S11 may be executed in parallel with steps S1 to S4 and S10.

Next, the strategy examination information display unit 17 creates and updates the strategy examination screen 200 (step S12). The strategy examination information display unit 17 displays the system corresponding to the operation selected in the area 104 in the area 202a on the basis of the setting table 300, and displays a button for displaying the positive effect and the negative effect for each system in the area 202b. The strategy examination information display unit 17 displays the extended facility input from the extended facility situation input screen 400 to be included in the system diagram, and further displays the situation of the system (the area 202c) and the recovery prospect (the area 202d). The strategy examination information display unit 17 displays, in the area 203, the system diagram of the system selected in the area 202a (a highest system when such a system not selected). When an unusable device is present in the system on the basis of the estimation result of the device state estimation unit 16, the strategy examination information display unit 17 displays that the device is unusable (FIG. 4). The output unit 19 outputs the updated strategy examination screen 200 to the display device 2 (step S13).

Next, for example, the operator inputs an operation of instructing to evaluate the operation using each system to the operation support device 10. Then, the operation evaluation unit 18 evaluates the operation for each system (step S14). For example, for operation 1, the operation evaluation unit 18 evaluates a transition of the monitoring parameter and a negative effect when operation 1 is performed by system 11. The operation evaluation unit 18 performs the same evaluation on each of systems 12 to 15. The operation evaluation unit 18 outputs an evaluation result to the strategy examination information display unit 17. The strategy examination information display unit 17 outputs the evaluation result of the operation (step S15). For example, the strategy examination information display unit 17 creates an image for displaying, in a pop-up manner on the strategy examination screen 200, an evaluation result such as "performing operation 1 using system 11 is valid for both the monitoring parameter and the negative effect, and performing operation 1 using system 12 is not valid for both the monitoring parameter and the negative effect", and the output unit 19 outputs this image to the display device 2.

As described above, according to the operation support device 10 of the present embodiment, even when an accident that cannot be coped with by an operation based on a procedure manual occurs, it is possible to constantly monitor whether or not functions important for safety are not damaged in the plant after the accident. It is possible to ascertain not only a current state but also a future state of such functions. Further, when a function important for safety is impaired or when a function important for safety is likely to be impaired, the operations are displayed in order of priority in the area 104, which makes it possible for the operator to clearly determine what coping (operations) should be performed. By displaying past values, current values, predicted values, and trends of a plurality of monitoring parameters, it is possible to anticipate whether an abnormality of a certain parameter impairs functions important for safety and prepare for coping in advance.

It is possible not only to ascertain an operation to be performed by referring to the strategy examination screen 200, but also to visually confirm what specific system is used to perform the operation. It is possible to confirm whether an effect is high when a certain system is used to perform the operation through the evaluation in the operation evaluation unit 18. With these functions, according to the embodiment, it is possible to reduce a burden on the operator, speed up a determination of the operator, and support performing appropriate coping after an accident occurs in the plant 1.

Figure 10:
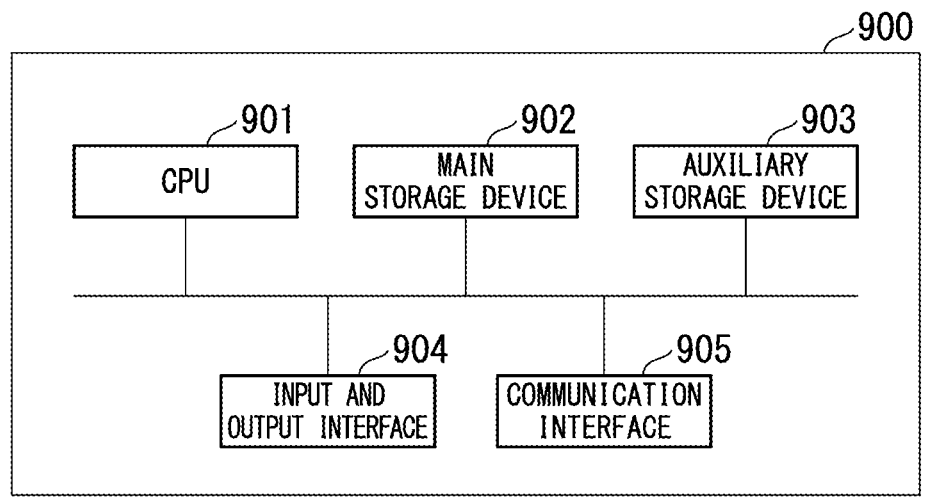
FIG. 10 is a diagram illustrating an example of a hardware configuration of the operation support device according to the embodiment of the present disclosure.

FIG. 10 is a diagram illustrating an example of a hardware configuration of the operation support device according to an embodiment of the present disclosure.

A computer 900 includes a CPU 901, a main storage device 902, an auxiliary storage device 903, an input and output interface 904, and a communication interface 905.

The operation support device 10 described above is mounted in the computer 900. Each function described above is stored in the auxiliary storage device 903 in the form of a program. The CPU 901 reads the program from the auxiliary storage device 903, develops the program in the main storage device 902, and executes the above processing according to the program. The CPU 901 secures a storage area in the main storage device 902 according to the program. The CPU 901 secures a storage area for storing data being processed in the auxiliary storage device 903 according to the program.

A program for realizing all or some of the functions of the operation support device 10 may be recorded in a computer-readable recording medium, and the program recorded in the recording medium may be loaded to a computer system and executed to perform processing of each functional unit. The "computer system" here includes an OS or hardware such as peripheral devices. The "computer system" includes a home page providing environment (or a display environment) when a WWW system is used. The "computer-readable recording medium" refers to a portable medium such as a CD, a DVD, and a USB, and a storage device such as a hard disk built into the computer system. When this program is distributed to the computer 900 via a communication line, the computer 900 receiving the distribution may develop the program in the main storage device 902 and execute the above processing. Further, the program may be a program for realizing some of the above-described functions or may be a program capable of realizing the above-described functions in a combination with a program previously stored in the computer system. The operation support device 10 may be configured of a plurality of computers 900 that can communicate with each other.

Figure 11:
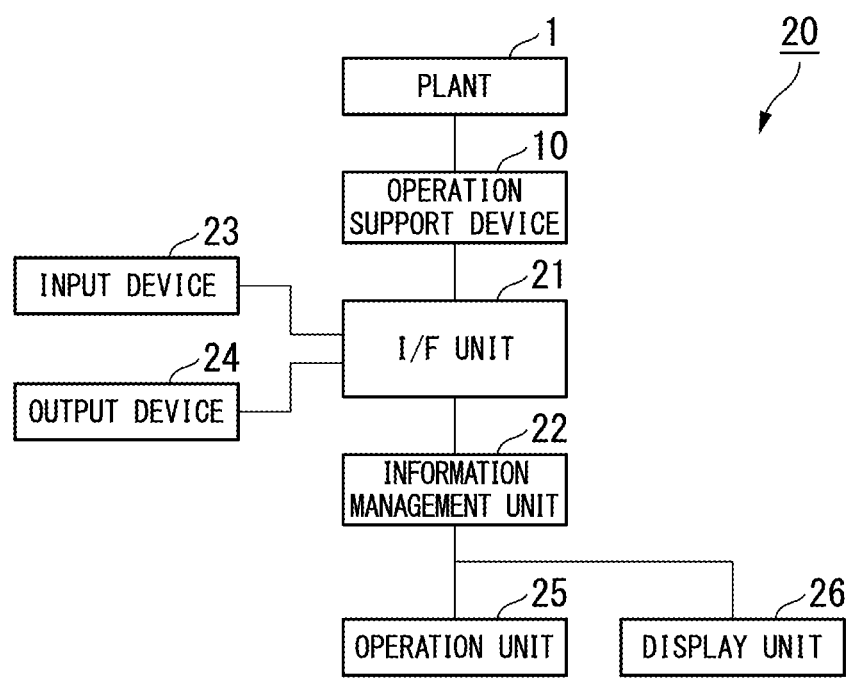
FIG. 11 is a block diagram illustrating an example of a display system according to an embodiment of the present disclosure.

The applicant has filed an application for an emergency decision-making support system (Japanese Patent Application 2015-555865). The operation support device 10 of the present disclosure can be used in cooperation with such a system. FIG. 11 is a block diagram illustrating an example of a display system according to an embodiment of the present disclosure.

As illustrated, the display system 20 includes an operation support device 10 connected to the plant 1, an I/F unit 21, an information management unit 22, an input device 23, an output device 24, an operation unit 25, a display unit 26. The display unit 26 is, for example, a large display that can be viewed by a plurality of operators. The large display may have a main screen and a sub-screen. The operation unit 25 is a touch panel provided on a screen of the display unit 26 or a mouse or keyboard connected to the display unit 26. The I/F unit 21 is configured as an input and output unit and performs input and output of various pieces of data. The input device 23 and the output device 24 are connected to the I/F unit 21. The input device 23 is a PC or mobile terminal, and the output device 24 is a printer, PC, or the like. The operation support device 10 is connected to the I/F unit 21. The operation support device 10 outputs the state monitoring screen 100 or the strategy examination screen 200 to the I/F unit 21. The information management unit 22 creates display data to be displayed on the display unit 26 by processing various pieces of data input from the outside. For example, the information management unit 22 displays the state monitoring screen 100 or the strategy examination screen 200 output by the operation support device 10 on the display unit 26. The information management unit 22 switches between displays of the display unit 26 on the basis of an operation of the operation unit 25. By incorporating the operation support device 10 into the display system 20, it is possible for a plurality of people to share states of functions important for safety and a deviation situation of the monitoring parameters.

As described above, several embodiments according to the present disclosure have been described, but all of these embodiments are presented as examples and are not intended to limit the scope of the invention. These embodiments can be implemented in various other forms, and various omissions, replacements, and changes can be made without departing from the scope of the invention. These embodiments and modifications thereof are included in the scope or spirit of the invention, as well as the scope of the invention described in the claims and equivalents thereof.

SUPPLEMENT

The display device, the display method, and the program described in the respective embodiments are ascertained, for example, as follows.

(1) A display device (the operation support device 10) according to a first aspect includes: a function state display unit 14 configured to display states of functions important for safety in a plant after accident occurrence in order of priority of the functions; and a state monitoring information display unit 15 configured to display a value of a monitoring parameter for determining the state of the function, display (a display of "NG" in the area 103) the monitoring parameter in a warning aspect when the value of the monitoring parameter deviates from a normal range, and display operations required for returning of the value of the monitoring parameter to the normal range in descending order of priority.

This makes it possible to monitor a state (whether the function is normal or the function is impaired) of functions important for safety (functions that should be protected as a minimum), and ascertain an operation to be performed when the function is likely to be impaired, even in a case in which an accident that cannot be coped by an operation according to a predetermined procedure occurs.

(2) The display device (the operation support device 10) according to a second aspect is the display device of (1), wherein the state monitoring information display unit 15 displays a deviating state of a current value and a predicted value of the monitoring parameter from the normal range.

This makes it possible to confirm the current and predicted values of the monitoring parameter that indicates states of functions important for safety.

(3) The display device (the operation support device 10) according to a third aspect is the display device of (1) to (2), wherein the state monitoring information display unit 15 displays a deviating state of a current value and a predicted value of a backup parameter serving as a substitute for the monitoring parameter from the normal range.

This makes it possible to continue monitoring the states of functions important for safety by confirming the current values and the predicted values of backup parameters serving as substitutes of the monitoring parameter even in a situation in which the monitoring parameters cannot be monitored for some reason.

(4) The display device (the operation support device 10) according to a fourth aspect is the display device of (1) to (3), wherein the state monitoring information display unit 15 displays a transition of the current value and a past value of the monitoring parameter, a transition of a future predicted value, a threshold value defining the normal range, and an expected time of deviation when the predicted value deviates from the normal range.

This makes it possible to ascertain a trend of the monitoring parameters, predict change in states of functions important for safety, and prepare for coping on the basis of the prediction.

(5) The display device (the operation support device 10) according to a fifth aspect is the display device of (1) to (4), further including: a strategy examination information display unit 17 configured to display targets of the operation that are facility systems (systems 11 to 15) of the plant required for recovery of the function to a normal state in order of priority.

This makes it possible to ascertain the type of system used to perform the operation and a priority thereof.

(6) The display device (the operation support device 10) according to a sixth aspect is the display device of (5), wherein the strategy examination information display unit 17 displays a configuration of the facility system as a system diagram.

This makes it possible to visually confirm the system used to perform the operation.

(7) The display device (the operation support device 10) according to a seventh aspect is the display device of (6), further including: an extended facility information input unit configured to receive an input of an operation situation of a device included in the facility system or an extended facility to be added to the facility system, wherein when the operation situation of the extended facility is input, the strategy examination information display unit adds the extended facility to the system diagram and displays the system diagram.

It becomes possible to manage and monitor an operation situation of an extended facility that is added and used later. By including the extended facility in the system diagram, it is possible to visually confirm a system used to perform the operation, including the extended facility. Further, it is also possible to input an operation situation of a device originally included in the facility system.

(8) The display device (the operation support device 10) according to an eighth aspect is the display device of (5) to (7), wherein the strategy examination information display unit 17 displays the operating state (no spraying of the spray 211 in FIG. 4) of the facility system according to a state of the device (the valve 213 or the like) included in the facility system.

This makes it possible to visually ascertain the operating state of the system used to execute the operation (whether or not an operation can be executed).

(9) The display device (the operation support device 10) according to a ninth aspect is the display device of (8), wherein the strategy examination information display unit 17 displays a cause of unusableness of the device when the device becomes unusable (the window 214).

This makes it possible for the operator to examine a coping method. For example, when the cause can be eliminated in a short period of time, the operator can examine removing the cause and restoring the device, and examine performing an operation using another system when the cause cannot be easily eliminated.

(10) The display device (the operation support device 10) according to a tenth aspect is the display device of (5) to (9), wherein the strategy examination information display unit 17 displays a positive or negative effect of the operation on the plant.

This makes it possible to confirm an effect in a case in which the operation has been performed, in advance.

(11) The display device (operation support device 10) according to an eleventh aspect is the display device of (1) to (10), wherein the strategy examination information display unit displays an operation situation of the facility system and a recovery respect time.

This makes it possible to ascertain the operation situation of the system and the recovery prospect.

(12) The display device (the operation support device 10) according to a twelfth aspect is the display device of (1) to (11), further including: an operation evaluation unit configured to evaluate the value of the monitoring parameter and an influence on the plant when the operation is performed using one system facility (any one of systems 11 to 15) included in the plant.

This makes it possible to confirm which system is most effective for operation.

(13) A display method according to a thirteenth aspect includes: displaying states of functions important for safety in a plant after accident occurrence in order of priority of the functions; and displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority.

(14) A program according to a fourteenth aspect causes the computer 900 to execute processing for: displaying states of functions important for safety in a plant after accident occurrence in order of priority of the functions; and displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority.

INDUSTRIAL APPLICABILITY

According to the display device, display method, and program described above, it is possible to support the determination of the operator and support performing appropriate operations after an accident occurs.

REFERENCE SIGNS LIST

1 Plant
2 Display device
11 Parameter acquisition unit
12 Parameter prediction unit
13 Monitoring unit
14 Function state display unit
15 State monitoring information display unit
16 Device state estimation unit
17 Strategy examination information display unit 18 Operation evaluation unit
19 Output unit
1A Storage unit
20 Display system
21 I/F unit
22 Information management unit
23 Input device
24 Output device
25 Operation unit
26 Display unit
900 Computer
901 CPU
902 Main storage device
903 Auxiliary storage device
904 Input and output interface
905 Communication interface

The invention claimed is:

1. A display device comprising:
 a function state display unit configured to display states of functions important for safety in a plant after accident occurrence in order of priority of the functions;
 a state monitoring information display unit configured to display a value of a monitoring parameter for determining the state of the function, display the monitoring parameter in a warning aspect when the value of the monitoring parameter deviates from a normal range, and display operations required for returning of the value of the monitoring parameter to the normal range in descending order of priority; and
 a strategy examination information display unit configured to display targets of the display operations that are facility systems of the plant required for recovery of the function to a normal state in order of priority.

2. The display device according to claim 1, wherein the state monitoring information display unit displays a deviating state of a current value and a predicted value of the monitoring parameter from the normal range.

3. The display device according to claim 1, wherein the state monitoring information display unit displays a deviating state of a current value and a predicted value of a backup parameter serving as a substitute for the monitoring parameter from the normal range.

4. The display device according to claim 1, wherein the state monitoring information display unit displays a transition of the current value and a past value of the monitoring parameter, a transition of a future predicted value, a threshold value defining the normal range, and an expected time of deviation when the predicted value deviates from the normal range.

5. The display device according to claim 1, wherein the strategy examination information display unit displays a configuration of the facility system as a system diagram.

6. The display device according to claim 5, further comprising:
 an extended facility information input unit configured to receive an input of information including an operation situation of a device included in the facility system or an extended facility to be added to the facility system, wherein when the information including the operation situation of the extended facility is input, the strategy examination information display unit adds the extended facility to the system diagram and displays the system diagram.

7. The display device according to claim 1, wherein the strategy examination information display unit displays an operating state of the facility system according to a state of the device included in the facility system.

8. The display device according to claim 7, wherein the strategy examination information display unit displays a cause of unusableness of the device when the device becomes unusable.

9. The display device according to claim 1, wherein the strategy examination information display unit displays a positive or negative effect of the operation on the plant.

10. The display device according to claim 1, wherein the strategy examination information display unit displays an operation situation of the facility system and a recovery respect time.

11. The display device according to claim 1, further comprising:
 an operation evaluation unit configured to evaluate the value of the monitoring parameter and an influence on the plant when the display operations are performed using one system facility included in the plant.

12. A display method comprising:
 displaying states of functions important for safety in a plant after accident occurrence in order of priority of the functions;
 displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority; and
 displaying targets of the operations that are facility systems of the plant required for recovery of the function to a normal state in order of priority.

13. A non-transitory computer-readable recording medium recording a program for causing a computer to execute processing for:
 displaying states of functions important for safety in a plant after accident occurrence in order of priority of the functions;
 displaying a value of a monitoring parameter for determining the state of the function, displaying the monitoring parameter in a warning aspect when the value of the monitoring parameter deviates from a normal range, and displaying operations required for returning of the value of the monitoring parameter to the normal range in descending order of priority; and
 displaying targets of the operations that are facility systems of the plant required for recovery of the function to a normal state in order of priority.

* * * * *